US008685565B2

(12) United States Patent
Lu et al.

(10) Patent No.: US 8,685,565 B2
(45) Date of Patent: *Apr. 1, 2014

(54) CATHODE COMPOSITIONS FOR LITHIUM-ION BATTERIES

(75) Inventors: Zhonghua Lu, Halifax (CA); Jeffrey R. Dahn, Hubley (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,766

(22) Filed: Jun. 29, 2012

(65) Prior Publication Data

US 2012/0282523 A1    Nov. 8, 2012

Related U.S. Application Data

(63) Continuation of application No. 11/276,832, filed on Mar. 16, 2006, now Pat. No. 8,241,791, which is a continuation of application No. 11/052,323, filed on Feb. 7, 2005, now Pat. No. 7,078,128, which is a continuation of application No. 09/845,178, filed on Apr. 27, 2001, now Pat. No. 6,964,828.

(51) Int. Cl.
   *H01M 4/00* (2006.01)

(52) U.S. Cl.
   USPC .......................... 429/220; 429/221

(58) Field of Classification Search
   USPC ........... 429/220, 221, 224, 229, 231.1, 231.2, 429/233
   See application file for complete search history.

(56) References Cited

U.S. PATENT DOCUMENTS

| 4,567,031 A | 1/1986 | Riley |
| 4,780,381 A | 10/1988 | Shacklette et al. |
| 5,264,201 A | 11/1993 | Dahn et al. |
| 5,292,601 A | 3/1994 | Sugeno et al. |
| 5,370,948 A | 12/1994 | Hasegawa et al. |
| 5,393,622 A | 2/1995 | Nitta et al. |
| 5,474,858 A | 12/1995 | Merritt |
| 5,478,671 A | 12/1995 | Idota |
| 5,478,675 A | 12/1995 | Nagaura |
| 5,521,027 A | 5/1996 | Okuno et al. |
| 5,525,443 A | 6/1996 | Okuno et al. |
| 5,531,920 A | 7/1996 | Mao et al. |
| 5,538,814 A | 7/1996 | Kamauchi et al. |

(Continued)

FOREIGN PATENT DOCUMENTS

| CN | 10975260 | 1/1995 |
| EP | 0 317 191 | 5/1989 |

(Continued)

OTHER PUBLICATIONS

Emory Harry, "Automated Probing of High-Speed Analog/Mixed Boards", *Electronics Test*, vol. 11, No. 6, (1988), pp. 76-82.

(Continued)

*Primary Examiner* — Mark F Huff
*Assistant Examiner* — Monique Wills
(74) *Attorney, Agent, or Firm* — Yen T. Florczak

(57) ABSTRACT

A lithium-ion battery has (a) an anode; (b) a cathode having a cathode composition of the formula $Li[M^4_y M^5_{1-2y} Mn_y]O_2$, wherein $0.083 < y < 0.5$ with the proviso that $M^4$ and $M^5$ do not include chromium, and wherein $M^4$ is Co and $M^5$ includes the combination of Li and Ni; and (c) an electrolyte.

8 Claims, 13 Drawing Sheets

(56) References Cited

U.S. PATENT DOCUMENTS

| | | |
|---|---|---|
| 5,565,688 A | 10/1996 | Hayashi |
| 5,589,300 A | 12/1996 | Fauteux et al. |
| 5,609,975 A | 3/1997 | Hasegawa et al. |
| 5,626,635 A | 5/1997 | Yamaura et al. |
| 5,718,989 A | 2/1998 | Aoki et al. |
| 5,742,070 A | 4/1998 | Hayashi et al. |
| 5,753,202 A | 5/1998 | Wang et al. |
| 5,770,173 A | 6/1998 | Nitta et al. |
| 5,773,168 A | 6/1998 | Kubo et al. |
| 5,783,332 A | 7/1998 | Amine et al. |
| 5,783,333 A | 7/1998 | Mayer |
| 5,795,558 A | 8/1998 | Aoki et al. |
| 5,858,324 A | 1/1999 | Dahn et al. |
| 5,869,208 A | 2/1999 | Miyasaka |
| 5,879,654 A | 3/1999 | van Ghemen et al. |
| 5,900,385 A | 5/1999 | Dahn et al. |
| 5,911,920 A | 6/1999 | Hasezaki et al. |
| 5,948,569 A | 9/1999 | Moses et al. |
| 5,981,106 A | 11/1999 | Amine et al. |
| 5,981,445 A | 11/1999 | Kirchnerova et al. |
| 5,992,773 A | 11/1999 | Schwechten |
| 5,993,998 A | 11/1999 | Yasuda |
| 6,007,947 A | 12/1999 | Mayer |
| 6,017,654 A | 1/2000 | Kumta et al. |
| 6,030,726 A | 2/2000 | Takeuchi et al. |
| 6,037,787 A | 3/2000 | Corwith |
| 6,040,089 A | 3/2000 | Manev et al. |
| 6,040,090 A | 3/2000 | Sunagawa et al. |
| 6,045,771 A | 4/2000 | Matsubara et al. |
| 6,066,957 A | 5/2000 | Van Loan et al. |
| 6,077,496 A | 6/2000 | Ito et al. |
| 6,103,422 A | 8/2000 | Kanai |
| 6,168,887 B1 | 1/2001 | Dahn et al. |
| 6,203,944 B1 | 3/2001 | Turner et al. |
| 6,203,947 B1 | 3/2001 | Peled et al. |
| 6,214,493 B1 | 4/2001 | Bruce et al. |
| 6,225,017 B1 | 5/2001 | Sato et al. |
| 6,248,477 B1 | 6/2001 | Howard, Jr. et al. |
| 6,255,017 B1 | 7/2001 | Turner |
| 6,270,925 B1 | 8/2001 | Takada et al. |
| 6,274,273 B1 | 8/2001 | Cho et al. |
| 6,277,521 B1 | 8/2001 | Gao et al. |
| 6,284,827 B1 | 9/2001 | Eckhardt et al. |
| 6,291,103 B1 | 9/2001 | Park et al. |
| 6,333,128 B1 | 12/2001 | Sunagawa et al. |
| 6,350,543 B2 | 2/2002 | Yang et al. |
| 6,361,756 B1 | 3/2002 | Gao et al. |
| 6,365,299 B1 | 4/2002 | Miyaki et al. |
| 6,368,749 B1 | 4/2002 | Yanai et al. |
| 6,372,385 B1 | 4/2002 | Kweon et al. |
| 6,395,250 B2 | 5/2002 | Matsubara et al. |
| 6,436,574 B1 | 8/2002 | Numata et al. |
| 6,436,577 B1 | 8/2002 | Kida et al. |
| 6,521,379 B2 | 2/2003 | Nishida et al. |
| 6,551,744 B1 | 4/2003 | Ohzuku et al. |
| 6,579,475 B2 | 6/2003 | Gao et al. |
| 6,582,852 B1 | 6/2003 | Gao et al. |
| 6,589,499 B2 | 7/2003 | Gao et al. |
| 6,589,694 B1 | 7/2003 | Gosho et al. |
| 6,620,400 B2 | 9/2003 | Gao et al. |
| 6,623,886 B2 | 9/2003 | Yang et al. |
| 6,660,432 B2 | 12/2003 | Paulsen et al. |
| 6,677,082 B2 | 1/2004 | Thackeray et al. |
| 6,680,143 B2 | 1/2004 | Thackeray et al. |
| 6,699,618 B2 | 3/2004 | Noda et al. |
| 6,808,848 B2 | 10/2004 | Nakanishi et al. |
| 6,881,393 B2 | 4/2005 | Spitler et al. |
| 6,884,543 B2 | 4/2005 | Tsujimoto et al. |
| 6,893,776 B2 | 5/2005 | Naruoka et al. |
| 6,964,828 B2 | 11/2005 | Lu et al. |
| 7,078,128 B2 | 7/2006 | Lu et al. |
| 7,205,072 B2 | 4/2007 | Kang et al. |
| 2001/0010807 A1 | 8/2001 | Matsubara |
| 2001/0016285 A1 | 8/2001 | Cho et al. |
| 2001/0024754 A1 | 9/2001 | Fukuzawa et al. |
| 2001/0031397 A1 | 10/2001 | Kweon et al. |
| 2002/0006550 A1 | 1/2002 | Yang et al. |
| 2002/0012843 A1 | 1/2002 | Munakata et al. |
| 2002/0015887 A1 | 2/2002 | Gao et al. |
| 2002/0018746 A1 | 2/2002 | Gao et al. |
| 2002/0053663 A1 | 5/2002 | Ito et al. |
| 2002/0071990 A1 | 6/2002 | Kweon et al. |
| 2002/0071991 A1 | 6/2002 | Kweon et al. |
| 2002/0086210 A1 | 7/2002 | Naruoka et al. |
| 2002/0119373 A1 | 8/2002 | Gao et al. |
| 2002/0127175 A1 | 9/2002 | Gao et al. |
| 2002/0150530 A1 | 10/2002 | Gao et al. |
| 2003/0022063 A1 | 1/2003 | Paulsen et al. |
| 2003/0027048 A1 | 2/2003 | Lu et al. |
| 2003/0031931 A1 | 2/2003 | Obrovac et al. |
| 2003/0035999 A1 | 2/2003 | Gao et al. |
| 2003/0082452 A1 | 5/2003 | Ueda et al. |
| 2003/0108793 A1* | 6/2003 | Dahn et al. ............. 429/224 |
| 2004/0197658 A1 | 10/2004 | Kase et al. |
| 2005/0130042 A1 | 6/2005 | Liu et al. |
| 2005/0142442 A1 | 6/2005 | Yuasa et al. |
| 2005/0260496 A1 | 11/2005 | Ueda et al. |
| 2006/0159994 A1 | 7/2006 | Dahn et al. |

FOREIGN PATENT DOCUMENTS

| | | |
|---|---|---|
| EP | 0 501 187 | 4/1996 |
| EP | 0 720 247 | 7/1996 |
| EP | 0 794 586 | 9/1997 |
| EP | 0 845 437 | 6/1998 |
| EP | 0 849 817 | 6/1998 |
| EP | 0 672 622 | 10/1998 |
| EP | 0 872 450 | 10/1998 |
| EP | 0 903 796 | 3/1999 |
| EP | 0 918 041 | 5/1999 |
| EP | 0 944 125 | 9/1999 |
| EP | 0 468 942 | 12/1999 |
| EP | 0 989 622 | 3/2000 |
| EP | 1 117 145 | 7/2001 |
| EP | 1 189 296 | 3/2002 |
| EP | 1 193 782 | 4/2002 |
| EP | 0 813 256 | 5/2002 |
| EP | 1 295 851 | 3/2003 |
| EP | 1 296 391 | 3/2003 |
| EP | 0 782 206 | 4/2003 |
| EP | 1 372 202 | 12/2003 |
| JP | 55-46288 | 3/1980 |
| JP | 5-67466 | 3/1993 |
| JP | 5-182667 | 7/1993 |
| JP | 5-198301 | 8/1993 |
| JP | 5-242891 | 9/1993 |
| JP | 5-283076 | 10/1993 |
| JP | 5-283077 | 10/1993 |
| JP | 6-60867 | 3/1994 |
| JP | 6-203829 | 7/1994 |
| JP | 6-275264 | 9/1994 |
| JP | 6-275269 | 9/1994 |
| JP | 6-342657 | 12/1994 |
| JP | 7-134985 | 5/1995 |
| JP | 7-235291 | 9/1995 |
| JP | 7-235292 | 9/1995 |
| JP | 8-31408 | 2/1996 |
| JP | 8-37007 | 2/1996 |
| JP | 8-171910 | 7/1996 |
| JP | 8-171935 | 7/1996 |
| JP | 8-213015 | 8/1996 |
| JP | 8-222220 | 8/1996 |
| JP | 2561556 | 9/1996 |
| JP | 8-273665 | 10/1996 |
| JP | 8-315819 | 11/1996 |
| JP | 9-7602 | 1/1997 |
| JP | 2668678 | 7/1997 |
| JP | 9-237631 | 9/1997 |
| JP | 2699176 | 9/1997 |
| JP | 9-298064 | 11/1997 |
| JP | 10-106565 | 4/1998 |
| JP | 10-172571 | 6/1998 |
| JP | 10-188982 | 7/1998 |
| JP | 10-255846 | 9/1998 |

(56) References Cited

FOREIGN PATENT DOCUMENTS

| | | |
|---|---|---|
| JP | 2822659 | 9/1998 |
| JP | 11-1323 | 1/1999 |
| JP | 11-25967 | 1/1999 |
| JP | 11-25980 | 1/1999 |
| JP | 11-86861 | 3/1999 |
| JP | 11-130440 | 5/1999 |
| JP | 11-195416 | 7/1999 |
| JP | 11-213999 | 8/1999 |
| JP | 11-273677 | 10/1999 |
| JP | 11-307094 | 11/1999 |
| JP | 11-354156 | 12/1999 |
| JP | 2000-503453 | 3/2000 |
| JP | 3042128 | 3/2000 |
| JP | 2000-133262 | 5/2000 |
| JP | 2000-173599 | 6/2000 |
| JP | 2000-173667 | 6/2000 |
| JP | 3079382 | 6/2000 |
| JP | 3079613 | 6/2000 |
| JP | 2000-186861 | 7/2000 |
| JP | 2000-195514 | 7/2000 |
| JP | 3089662 | 7/2000 |
| JP | 2000-223122 | 8/2000 |
| JP | 2000-223157 | 8/2000 |
| JP | 2000-231919 | 8/2000 |
| JP | 2000-268821 | 9/2000 |
| JP | 2000-268864 | 9/2000 |
| JP | 3110728 | 9/2000 |
| JP | 2000-277151 | 10/2000 |
| JP | 2000-294240 | 10/2000 |
| JP | 2000-294242 | 10/2000 |
| JP | 2000-323123 | 11/2000 |
| JP | 2000-323142 | 11/2000 |
| JP | 2000-327338 | 11/2000 |
| JP | 2000-327339 | 11/2000 |
| JP | 3130813 | 11/2000 |
| JP | 2000-336109 | 12/2000 |
| JP | 2001-6672 | 1/2001 |
| JP | 2001-52702 | 2/2001 |
| JP | 3181296 | 4/2001 |
| JP | 3182271 | 4/2001 |
| JP | 2001-143710 | 5/2001 |
| JP | 2001-143760 | 5/2001 |
| JP | 2001-146426 | 5/2001 |
| JP | 3197763 | 6/2001 |
| JP | 2001-185218 | 7/2001 |
| JP | 2001-282767 | 9/2001 |
| JP | 2001-345101 | 12/2001 |
| JP | 3258841 | 12/2001 |
| JP | 2002-42813 | 2/2002 |
| JP | 2002-63900 | 2/2002 |
| JP | 2002-110253 | 4/2002 |
| JP | 3301931 | 4/2002 |
| JP | 2002-151076 | 5/2002 |
| JP | 3308232 | 5/2002 |
| JP | 3318941 | 6/2002 |
| JP | 2002-260655 | 9/2002 |
| JP | 2002-529361 | 9/2002 |
| JP | 2002-530260 | 9/2002 |
| JP | 2002-304993 | 10/2002 |
| JP | 3356157 | 10/2002 |
| JP | 2002-338246 | 11/2002 |
| JP | 2002-343356 | 11/2002 |
| JP | 3378222 | 12/2002 |
| JP | 2003-238165 | 8/2003 |
| JP | 3524762 | 2/2004 |
| JP | 3536947 | 3/2004 |
| JP | 3649953 | 2/2005 |
| WO | WO 93/04996 | 3/1993 |
| WO | WO 97/26683 | 7/1997 |
| WO | WO 98/57386 | 12/1998 |
| WO | WO 00/03444 | 1/2000 |
| WO | WO 00/23380 | 4/2000 |
| WO | WO 01/15252 | 3/2001 |
| WO | WO 02/40404 | 5/2002 |
| WO | WO 02/089234 | 11/2002 |

OTHER PUBLICATIONS

Wiles et al., "A new computer program for Rietveld analysis of X-ray powder diffraction patterns", *J. Appl. Cryst.* (1981), 14, 149-151.

Delmas et al., "Soft chemistry in $A_xMO_2$ sheet oxides", *Revue de Chimie minerale*, t. 19, (1982), 343-351.

Hill et al., "Peak Shape Variation in Fixed-Wavelength Neutron Powder Diffraction and its Effect on Structural Parameters Obtained by Rietveld Analysis", *J. Appl. Cryst.* (1985) 18, 173-180.

Delmas et al., "Electrochemical and physical properties of the $Li_xNi_{1-y}Co_yO_2$ phases", *Solid State Ionics* 53-56 (1992), 370-375.

Rossen et al., "Structure and electrochemistry of $Li_xMn_yNi_{1-y}O_2$", *Solid State Ionics* 57 (1992), 311-318.

Jones et al., "Structure and electrochemistry of $Li_xCr_yCo_{1-y}O_2$", *Solid State Ionics* 68 (1994), 65-69.

Richard et al., "The effect of ammonia reduction on the spinel electrode materials, $LiMn_2O_4$ and $Li(Li_{1/3}Mn_{5/3})O_4$", *Solid State Ionics*, 73, (1994), pp. 81-91.

Armstrong et al., "Synthesis of layered $LiMnO_2$ as an electrode for rechargeable lithium batteries", *Letters to Nature*, vol. 381, Jun. 1996, 499-500.

Numata et al., "Synthesis of Solid Solutions in a System of $LiCoO_2$-$Li_2MnO_3$ for Cathode Materials of Secondary Lithium Batteries", *Chemistry Letters* (1997), 725-726.

Richard et al., "A Cell for in Situ X-Ray Diffraction Based on Coin Cell Hardware and Bellcore Plastic Electrode Technology", *J. Electrochem. Soc.*, vol. 144, No. 2, Feb. 1997, pp. 554-557.

Dahn et al., "Structure and Electrochemistry of $Li_2Cr_xMn_{2-x}O_4$ for $1.0 \leq x \leq 1.5$", *J. Electrochem. Soc.*, vol. 145, No. 3 (1998), 851-859.

Neudecker et al., "Lithium Manganese Nickel Oxides $Li_x(Mn_yNi_{1-y})_{2-x}O_2$", *J. Electrochem. Soc.*, vol. 145, No. 12, (1998), 4160-4168.

Spahr et al., "Characterization of Layered Lithium Nickel Manganese Oxides Synthesized by a Novel Oxidative Coprecipitation Method and Their Electrochemical Performance as Lithium Insertion Electrode Materials", *J. Electrochem. Soc.*, vol. 145, No. 4, (1998), 1113-1121.

Tabuchi et al., "Synthesis of $LiMnO_2$ with α-$NaMnO_2$-Type Structure by a Mixed-Alkaline Hydrothermal Reaction", *J. Electrochem. Soc.*, vol. 145, No. 4, Apr. 1998, pp. L49-L52.

Liu et al., "Synthesis and characterization of $LiNi_{1-x-y}Co_xMn_yO_2$ as the cathode materials of secondary lithium batteries", *J. of Power Sources*, vol. 81-82, (1999), pp. 416-419.

Numata et al., "Synthesis and characterization of layer structured solid solutions in the system of $LiCoO_2$-$Li_2MnO_3$", *Solid State Ionics* 117 (1999), 257-263.

Numata et al., "Preparation and electrochemical properties of layered lithium—cobalt—manganese oxides", *Solid State Ionics* 118 (1999), 117-120.

Paulsen et al., "Layered Li—Mn—Oxide with the O2 Structure: A Cathode Material for Li-Ion Cells Which Does Not Convert to Spinel", *J. of Electrochem. Soc.*, 146 (10), (1999), pp. 3560-3565.

Cho et al., "Improvement of Structural Stability of $LiCoO_2$ Cathode during Electrochemical Cycling by Sol-Gel Coating of $SnO_2$", *Electrochem. and Solide-State Letters*, 3 (8), (2000), pp. 362-365.

Cho et al., "Novel $LiCoO_2$ Cathode Material with $Al_2O_3$ Coating for a Li Ion Cell", *Chem. Mater.*, 12, (2000), pp. 3788-3791.

Paulsen et al., "O2 Structure $Li2/3[Ni1/3Mn2/3]O2$: A New Layered Cathode Material for Rechargeable Lithium Batteries", *J. Electrochem. Soc.*, 147 (3) (2000), 861-868.

Desilvestro et al., "Novel layered cathode materials for advanced lithium ion batteries", Pacific Lithium Limited, presented at the International Li Battery Conference in Como, Italy, May 2000.

10th International Meeting on Lithium Batteries, "Lithium 2000", Villa Erba Conference Cetner, Como, Italy, May 28-Jun. 2, 2000.

Yoshio et al., "Preparation and Properties of $LiCo_yMn_xNi_{1-x-y}O_2$ as a Cathode for Lithium Ion Batteries", *Journal of Power Sources 90*, (2000), pp. 176-181.

Naruoka et al., "Development of $LiNi_{1-x-y}Co_xMn_yO_2$ System Positive Active Material for Lithium Ion Cells", *GS News Technical Report*, vol. 59, No. 2, (2000), 13-17.

Quine et al., "Layered $Li_xMn_{1-y}Ni_yO_2$ intercalation electrodes", J. Mater. Chem., 10, (2000), pp. 2838-2841.

(56) References Cited

OTHER PUBLICATIONS

Cho et al., "LiCoO$_2$ Cathode Material That Does Not Show a Phase Transition from Hexagonal to Monoclinic Phase", *J. of Electrochem. Soc.*, 148, (10), (2001), pp. A1110-A1115.

Cho et al., "Zero-Strain Intercalation Cathode for Rechargeable Li-Ion Cell", *Angew. Chem. Int. Ed.*, 40, No. 18, (2001), pp. 3367-3369.

Ohzuku et al., "Layered Lithium Insertion Material of LiCo$_{1/3}$Ni$_{1/3}$Mn$_{1/3}$O$_2$ for Lithium-Ion Batteries", *Chemistry Letters*, vol. 30, No. 7, (2001), pp. 642-643.

Lu et al., "The Effect of Co Substitution for Ni on the Structure and Electrochemical Behavior of T2 and O2 Structure Li$_{2/3}$[Co$_x$Ni$_{1/3-x}$Mn$_{2/3}$]O$_2$", *J. of Electrochem. Soc.*, 148 (3), (2001), pp. A237-A240.

Robertson et al., "Layered Li$_x$MN$_{1-y}$CO$_y$O$_2$ Intercalation Electrodes Influence of Ion Exchange on Capacity and Structure upon Cycling", *Chem. Mater.*, vol. 13, (2001), pp. 2380-2386.

Kosova et al., "Soft Mechanochemical Synthesis: Preparation of Cathode Materials for Rechargeable Lithium Batteries", *Ann. Chim. Sci. Mat.*, 27 (6), 2002, pp. 77-90.

Lu et al., "Understanding the Anomalous Capacity of Li/Li[Ni$_x$Li$_{(1/3-2x/3)}$Mn$_{(2/3-x/3)}$] O$_2$ Cells Using In Situ X-Ray Diffraction and Electrochemical Studies", *J. of Electrochemical Soc.*, vol. 149 (7), (2002), pp. A815-A822.

MacNeil et al., "Structure and Electrochemistry of Li[Ni$_x$Co$_{1-2x}$Mn$_x$]O$_2$ (0 ≤ X ≤ 1/2)", *J. of Electrochem. Soc.*, 149 (10), (2002), pp. A1332-A1336.

"How Jet Mills Operate", The Jet Pulverizer Company, pp. 1-3, dated Aug. 10, 2002, downloaded from the Internet Archive website at http://web.archive.org/web/20021013015854/http://www.jetpul.com/mequip/milloper.htm.

Jouanneau et al., "Synthesis, Characterization, and Electrochemical Behavior of Improved Li[Ni$_x$Co$_{1-2x}$Mn$_x$]O$_2$ (0.1 ≤ X ≤ 0.5)", *J. of Electrochem. Soc.*, 150 (12), (2003), pp. A1637-A1642

Venkatraman et al., "Factors influencing the chemical lithium extraction rate from layered LiNi$_{1-y-z}$Co$_y$Mn$_z$O$_2$ cathodes", *Electrochem. Com.* 6, 2004, pp. 832-837.

Jiang et al., "Electrochemical and Thermal Comparisons of Li[Ni$_{0.1}$Co$_{0.8}$Mn$_{0.1}$]O$_2$ Synthesized at Different Temperatures (900, 1000, and 1100° C.)", *J. of Electrochem. Soc.*, 152 (1), (2005), pp. A19-A22.

Kang et al., "Electrodes with High Power and High Capacity for Rechargeable Lithium Batteries", *Science*, vol. 311, Feb. 17, 2006, pp. 977-980.

Kosova et al., Optimization of Ni$^{2+}$/Ni$^{3+}$ ratio in layered Li(Ni,Mn,Co)O$_2$ cathodes for better electrochemistry, *Journal of Power Sources*, 174, (2007), pp. 965-969.

ITC Amended Complaint, Apr. 11, 2007.

Minnesota Amended Complaint, Mar. 16, 2007.

Bloomberg.com, "Sony, Lenovo Sued . . . ", Mar. 7, 2007.

Yahoo report, "Agency Investigates 3M Patent Complaint", Apr. 23, 2007.

"Respondent Sanyo Electric Co. Response", Jun. 1, 2007.

Yahoo report, Matsushita . . . 3M Reach Agreement, May 31, 2007.

"3M, BC Settle", Jul. 5, 2007.

Minnesota Order granting stay, Jun. 7, 2007.

Adamson, George, "Declaration under 37 C.F.R. § 1.132", Jul. 27, 2011, 8 pages.

Request for Ex Parte Reexamination, U.S. Patent No. 7,078,128, Jul. 29, 2011, 118 pages.

Mendiboure et al., "New Layered Structure Obtained by Electrochemical Deintercalation of the Metastable LiCoO$_2$ (O2) Variety", *Mat. Res. Bull.*, vol. 19, (1984), pp. 1383-1392.

Yoshio et al., "Lithium Ion Secondary Battery (2$^{nd}$ Edition)—Materials and Applications", Nikkan Kogyo Shimbun Ltd., Jan. 27, 2000.

* cited by examiner

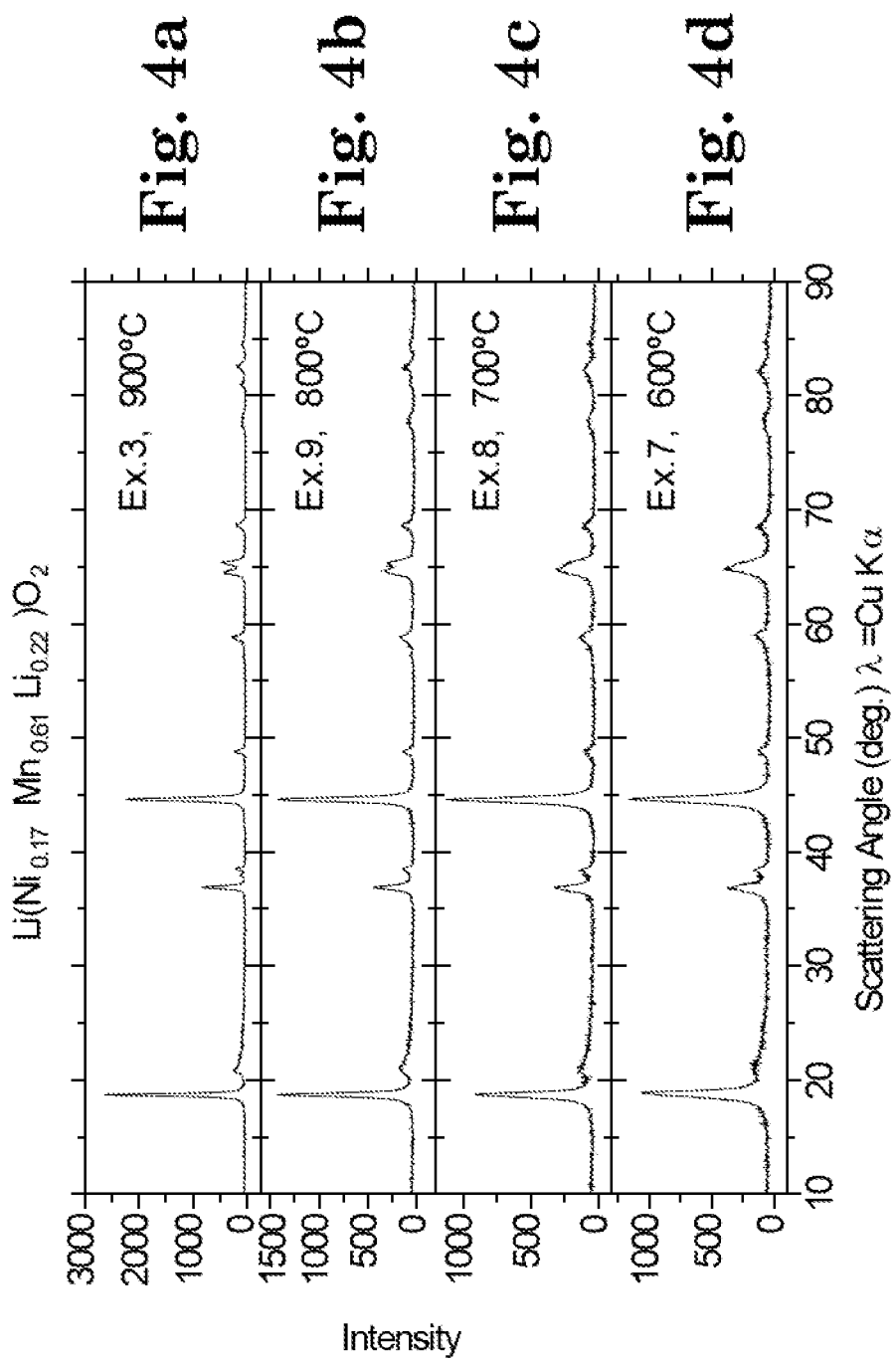

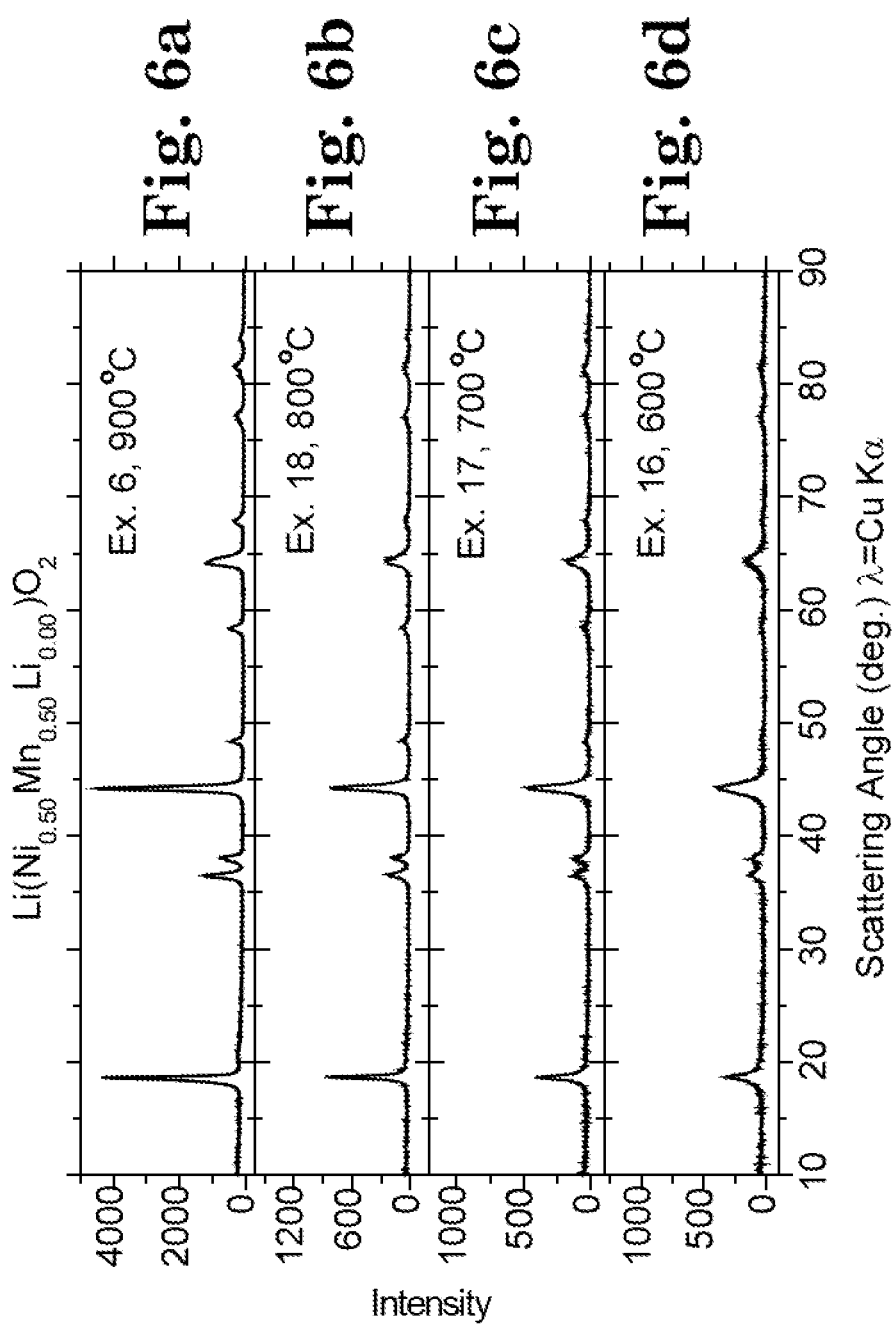

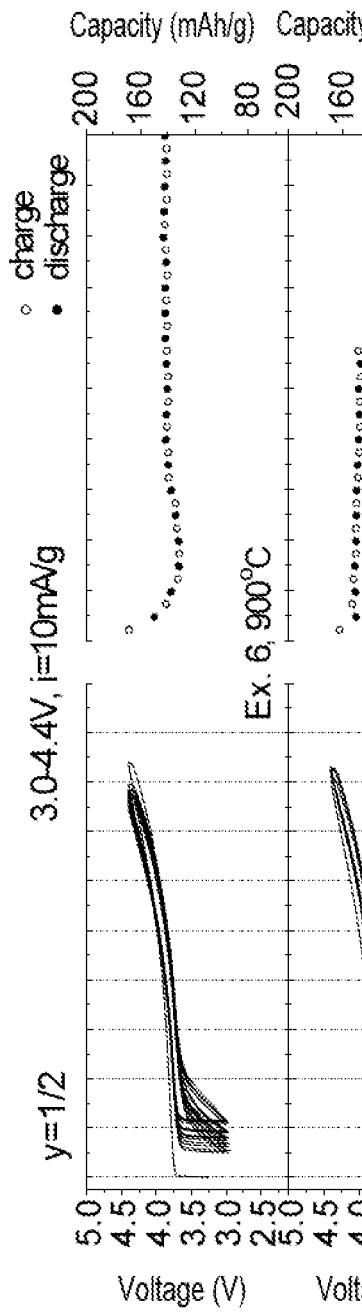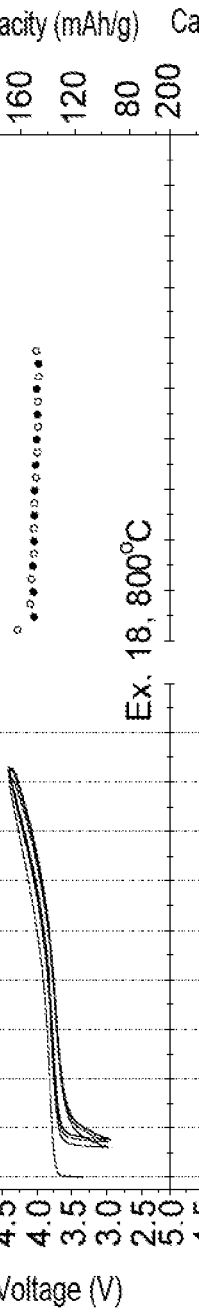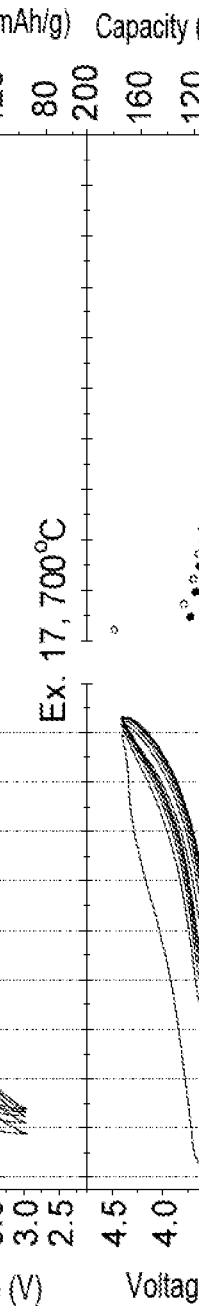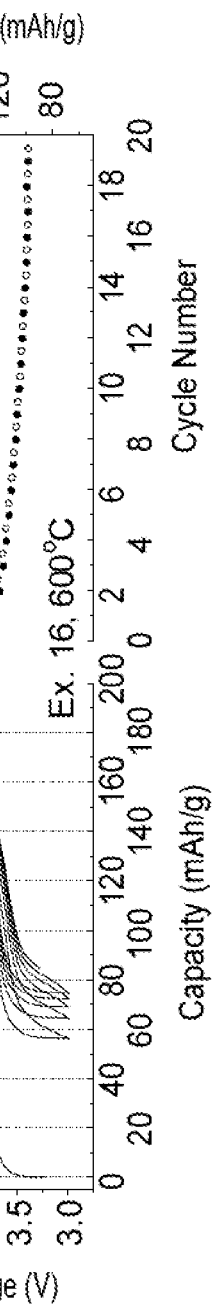
Fig. 7a
Fig. 7b
Fig. 7c
Fig. 7d

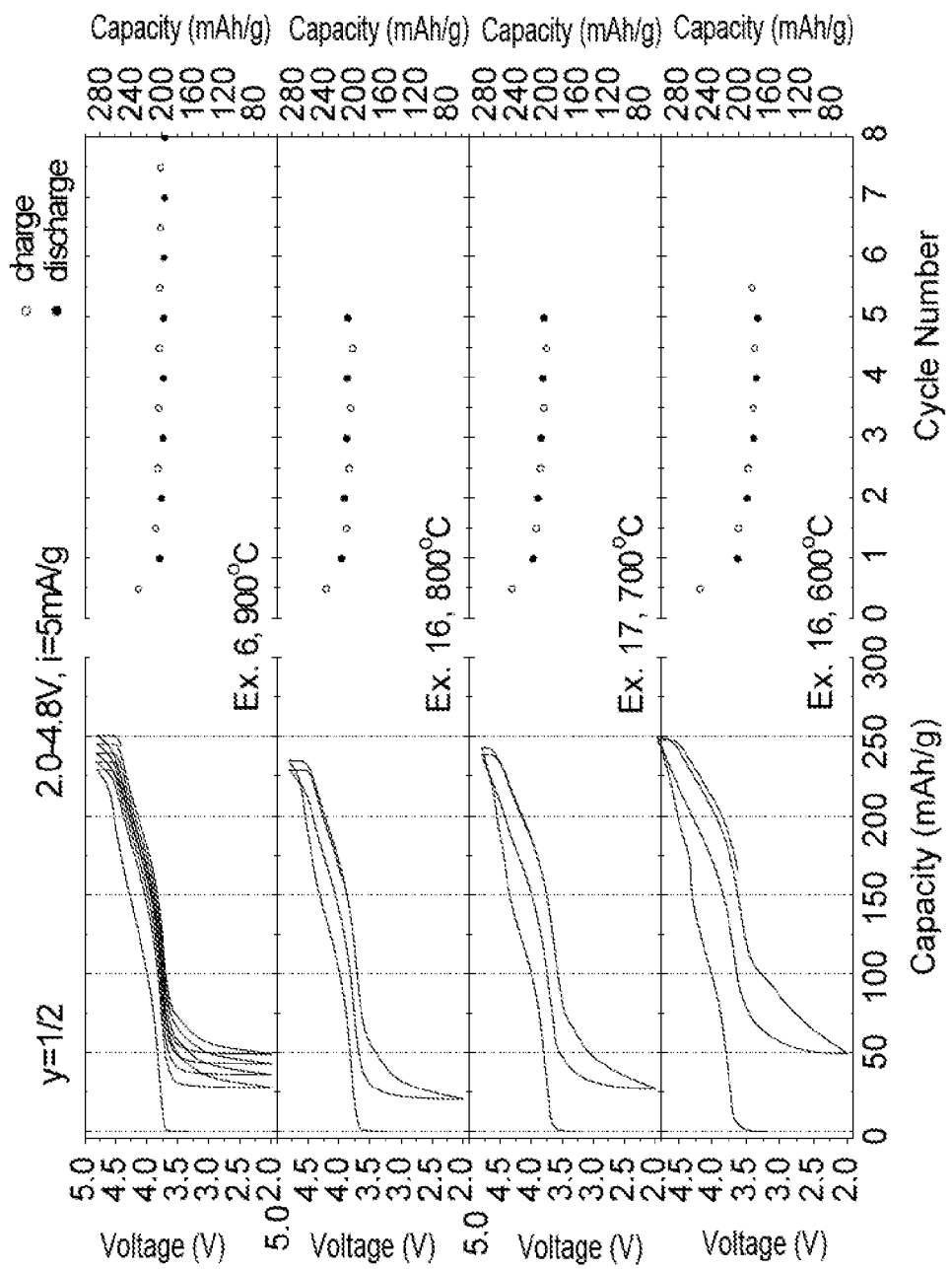

CATHODE COMPOSITIONS FOR LITHIUM-ION BATTERIES

CROSS REFERENCE TO RELATED APPLICATIONS

This application is a continuation of U.S. application Ser. No. 11/276,832, filed Mar. 16, 2006, now U.S. Pat. No. 8,241, 791, which is a continuation of U.S. application Ser. No. 11/052,323, filed Feb. 7, 2005, issued as U.S. Pat. No. 7,078, 128, which is a continuation of U.S. application Ser. No. 09/845,178, filed Apr. 27, 2001, issued as U.S. Pat. No. 6,964, 828, the disclosure of which is incorporated by reference in their entirety herein.

TECHNICAL FIELD

This invention relates to preparing compositions useful as cathodes for lithium-ion batteries.

BACKGROUND

Lithium-ion batteries typically include an anode, an electrolyte, and a cathode that contains lithium in the form of a lithium-transition metal oxide. Examples of transition metal oxides that have been used include cobalt dioxide, nickel dioxide, and manganese dioxide. None of these materials, however, exhibits an optimal combination of high initial capacity, high thermal stability, and good capacity retention after repeated charge-discharge cycling.

SUMMARY

In general, the invention features a cathode composition for a lithium-ion battery having the formula $Li[M^1_{(1-x)}Mn_x]O_2$ where $0<x<1$ and $M^1$ represents one or more metal elements, with the proviso that $M^1$ is a metal element other than chromium. The composition is in the form of a single phase having an O3 crystal structure that does not undergo a phase transformation to a spinel crystal structure when incorporated in a lithium-ion battery and cycled for 100 full charge-discharge cycles at 30° C. and a final capacity of 130 mAh/g using a discharge current of 30 mA/g. The invention also features lithium-ion batteries incorporating these cathode compositions in combination with an anode and an electrolyte.

In one embodiment, $x=(2-y)/3$ and $M^1_{(1-x)}$ has the formula $Li_{(1-2y)/3}M^2_y$, where $0<y<0.5$ (preferably $0.083<y<0.5$, and more preferably $0.167<y<0.5$) and $M^2$ represents one or more metal elements, with the proviso that $M^2$ is a metal element other than chromium. The resulting cathode composition has the formula $Li[Li_{(1-2y)/3}M^2_y Mn_{(2-y)/3}]O_2$.

In a second embodiment, $x=(2-2y)/3$ and $M^1_{(1-x)}$ has the formula $Li_{(1-y)/3}M^3_y$, where $0<y<0.5$ (preferably $0.083<y<0.5$, and more preferably $0.167<y<0.5$) and $M^3$ represents one or more metal elements, with the proviso that $M^3$ is a metal element other than chromium. The resulting cathode composition has the formula $Li[Li_{(1-y)/3}M^3_y Mn_{(2-2y)/3}]O_2$.

In a third embodiment, $x=y$ and $M^1_{(1-x)}$ has the formula $M^4_y M^5_{1-2y}$, where $0<y<0.5$ (preferably $0.083<y<0.5$, and more preferably $0.167<y<0.5$), $M^4$ is a metal element other than chromium, and $M^5$ is a metal element other than chromium and different from $M^4$. The resulting cathode composition has the formula $Li[M^4_y M^5_{1-2y} Mn_y]O_2$.

The invention provides cathode compositions, and lithium-ion batteries incorporating these compositions, that exhibit high initial capacities and good capacity retention after repeated charge-discharge cycling. In addition, the cathode compositions do not evolve substantial amounts of heat during elevated temperature abuse, thereby improving battery safety.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 4(a)-(d) are x-ray diffraction patterns for the samples described in Examples 3 and 7-9.

FIGS. 6(a)-(d) are x-ray diffraction patterns for the samples described in Examples 6 and 16-18.

FIGS. 7(a)-(d) are plots of voltage versus capacity and capacity versus cycle number for the samples described in Examples 6 and 16-18 cycled between 4.4 V and 3.0 V.

FIGS. 8(a)-(d) are plots of voltage versus capacity and capacity versus cycle number for the samples described in Examples 6 and 16-18 cycled between 4.8 V and 2.0 V.

DETAILED DESCRIPTION

Figure 1:
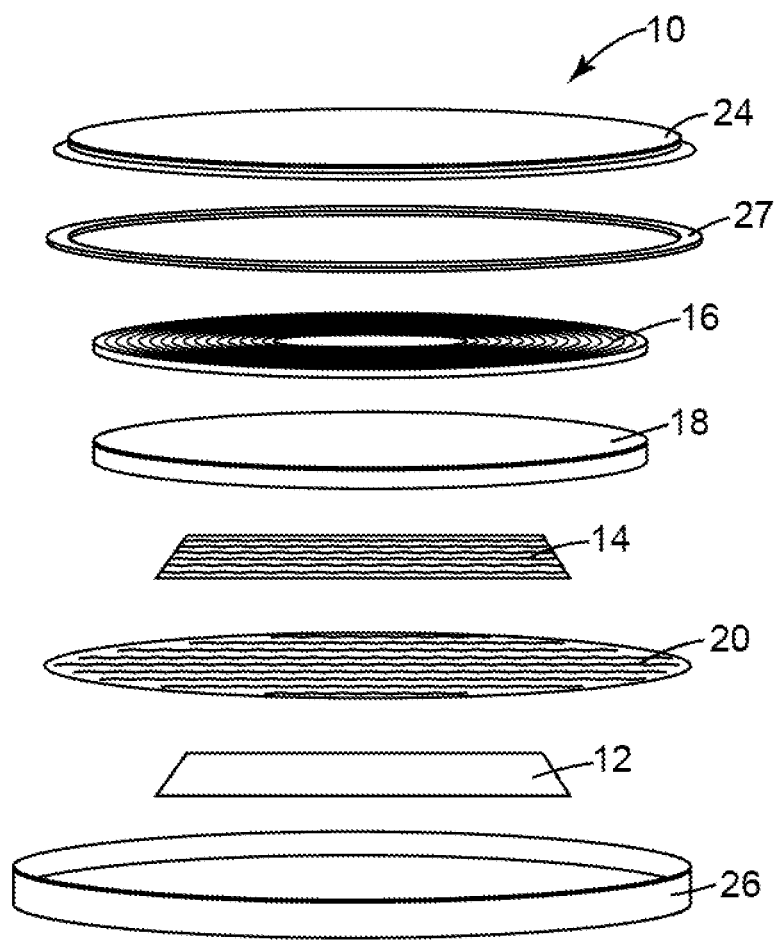
FIG. 1 is an exploded perspective view of an electrochemical cell used to test various electrode compositions.
Figure 2A:
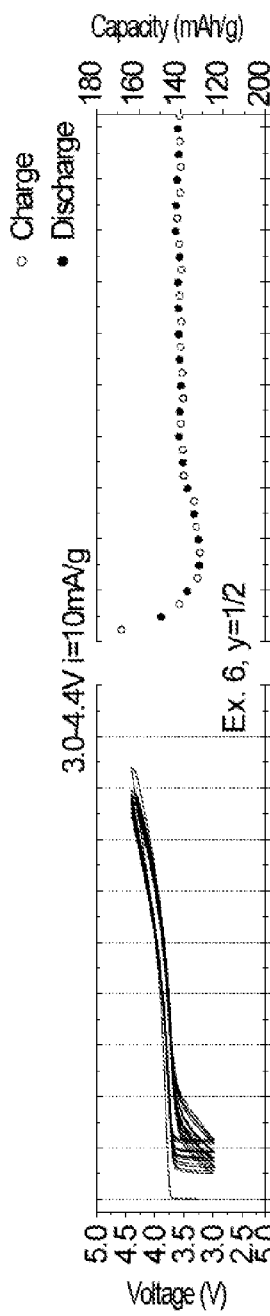
FIGS. 2(a)-(e) are plots of voltage versus capacity and capacity versus cycle number for the samples described in Examples 1 and 3-6 cycled between 4.4 V and 3.0 V.
Figure 2B:
Figure 2C:
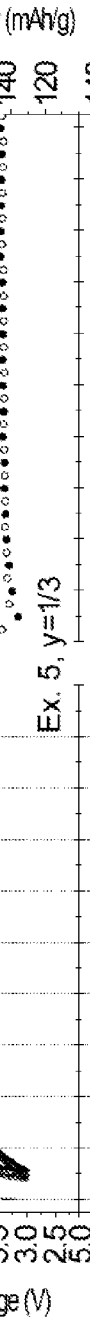
Figure 2D:
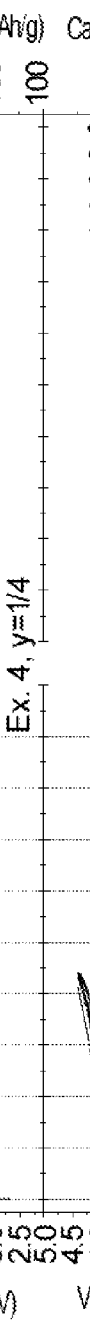
Figure 2E:
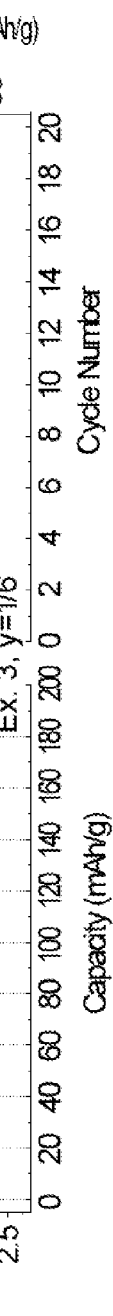
Figure 3A:
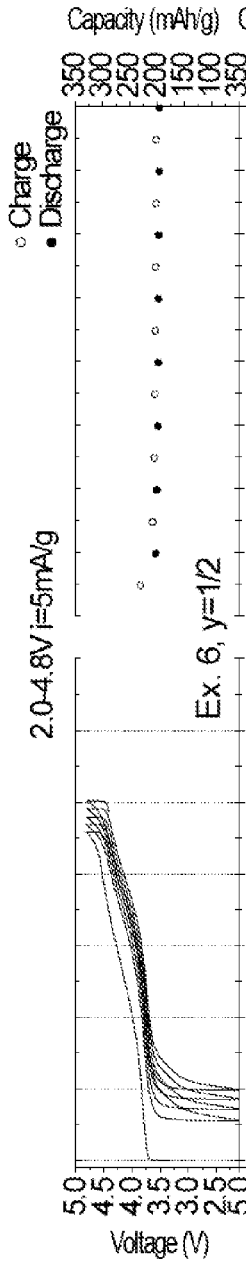
FIGS. 3(a)-(e) are plots of voltage versus capacity and capacity versus cycle number for the samples described in Examples 1 and 3-6 cycled between 4.8 V and 2.0 V.
Figure 3B:
Figure 3C:
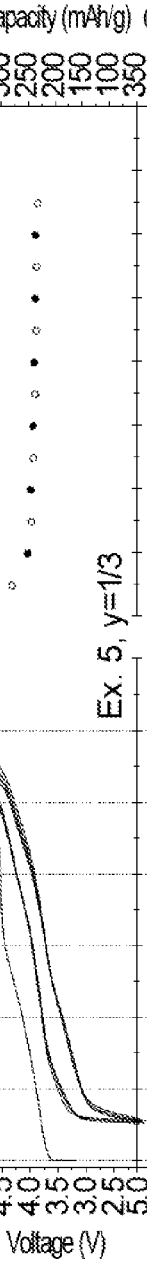
Figure 3D:
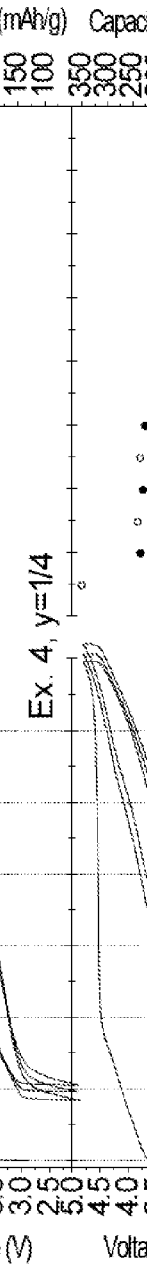
Figure 3E:
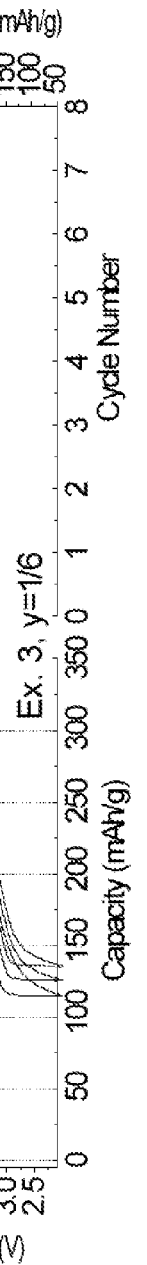
Figures 5A, 5B, 5C, 5D:
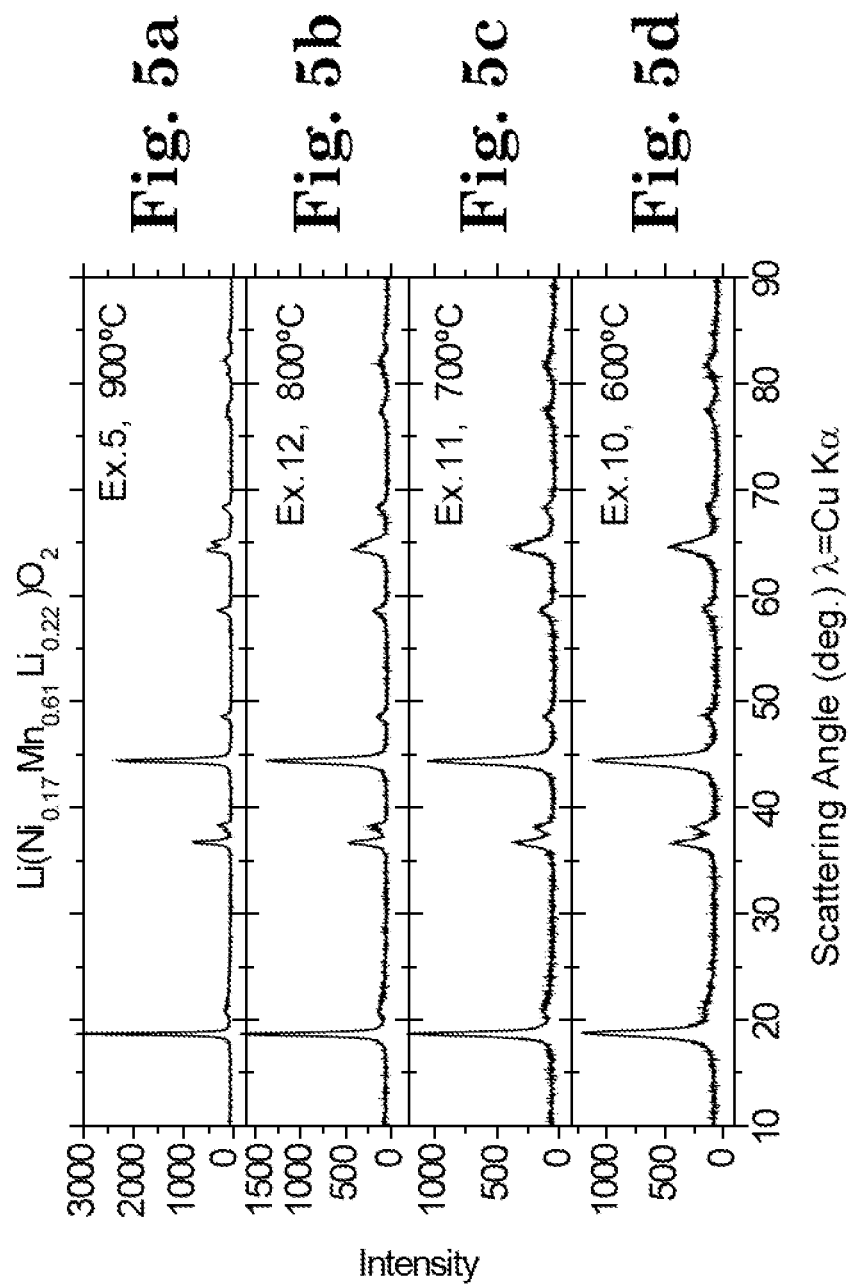
FIGS. 5(a)-(d) are x-ray diffraction patterns for the samples described in Examples 5 and 10-12.

Cathode compositions have the formulae set forth in the Summary of the Invention, above. The formulae themselves, as well as the choice of particular metal elements, and combinations thereof, for $M^1$-$M^5$, reflect certain criteria that the inventors have discovered are useful for maximizing cathode performance. First, the cathode compositions preferably adopt an O3 crystal structure featuring layers generally arranged in the sequence lithium-oxygen-metal-oxygen-lithium. This crystal structure is retained when the cathode composition is incorporated in a lithium-ion battery and cycled for 100 full charge-discharge cycles at 30° C. and a final capacity of 130 mAh/g using a discharge current of 30 mA/g, rather than transforming into a spinel-type crystal structure under these conditions. In addition, to maximize rapid diffusion in the lithium layers, and thus battery performance, it is preferred to minimize the presence of metal elements in the lithium layers. It is further preferred that at least one of the metal elements be oxidizable within the electrochemical window of the electrolyte incorporated in the battery.

The cathode compositions may be synthesized by jet milling or by combining precursors of the metal elements (e.g., hydroxides, nitrates, and the like), followed by heating to generate the cathode composition. Heating is preferably conducted in air at temperatures of at least about 600° C., more preferably at least 800° C. In general, higher temperatures are preferred because they lead to materials with increased crystallinity. The ability to conduct the heating process in air is desirable because it obviates the need and associated expense of maintaining an inert atmosphere. Accordingly, the particular metal elements are selected such that they exhibit appropriate oxidation states in air at the desired synthesis temperature. Conversely, the synthesis temperature may be adjusted so that a particular metal element exists in a desired oxidation state in air at that temperature.

In general, examples of suitable metal elements for inclusion in the cathode composition include Ni, Co, Fe, Cu, Li, Zn, V, and combinations thereof. Particularly preferred cathode compositions are those having the following formulae:

$$Li[Li_{(1-2y)/3}Ni_yMn_{(2-y)/3}]O_2;$$

$$Li[Li_{(1-y)/3}Co_yMn_{(2-2y)/3}]O_2; \text{ and}$$

$$Li[Ni_yCo_{1-2y}Mn_y]O_2.$$

The cathode compositions are combined with an anode and an electrolyte to form a lithium-ion battery. Examples of suitable anodes include lithium metal, graphite, and lithium alloy compositions, e.g., of the type described in Turner, U.S. Pat. No. 6,203,944 entitled "Electrode for a Lithium Battery" and Turner, WO 00/03444 entitled "Electrode Material and Compositions." The electrolyte may be liquid or solid. Examples of solid electrolytes include polymeric electrolytes such as polyethylene oxide, polytetrafluoroethylene, fluorine-containing copolymers, and combinations thereof. Examples of liquid electrolytes include ethylene carbonate, diethyl carbonate, propylene carbonate, and combinations thereof. The electrolyte is provided with a lithium electrolyte salt. Examples of suitable salts include $LiPF_6$, $LiBF_4$, and $LiClO_4$.

The invention will now be described further by way of the following examples.

EXAMPLES

Electrochemical Cell Preparation

Electrodes were prepared as follows. About 21 wt. % active cathode material (prepared as described below), 5.3 wt. % Kynar Flex 2801 (a vinylidene fluoride-hexafluoropropylene copolymer commercially available from Atochem), 8.4 wt. % dibutyl phthalate, 2.1 wt. % Super S carbon black (commercially available from MMM Carbon, Belgium), and 63.2 wt. % acetone were mechanically shaken for 1-2 hours in a mixing vial to which a zirconia bead (8 mm diameter) had been added to form a uniform slurry. The slurry was then spread in a thin layer (about 150 micrometers thick) on a glass plate using a notch-bar spreader. After evaporating the acetone, the resulting film was peeled from the glass and a circular electrode measuring 1.3 cm in diameter was punched from the film using an electrode punch, after which the electrode was soaked in diethyl ether for about 10 minutes to remove dibutyl phthalate and to form pores in the electrode. The ether rinse was repeated two times. The electrodes were then dried at 90° C. overnight. At the conclusion of the drying period, the circular electrode was weighed and the active mass (the total weight of the circular electrode multiplied by the fraction of the electrode weight made up of the active cathode material) determined. Typically, the electrodes contained 74% by weight active material. The electrodes were then taken into an argon-filled glove box where the electrochemical cell was constructed.

An exploded perspective view of the electrochemical cell 10 is shown in FIG. 1. A stainless steel cap 24 and special oxidation resistant case 26 contain the cell and serve as the negative and positive terminals respectively. The cathode 12 was the electrode prepared as described above. The anode 14 was a lithium foil having a thickness of 125 micrometers; the anode also functioned as a reference electrode. The cell featured 2325 coin-cell hardware, equipped with a spacer plate 18 (304 stainless steel) and a disc spring 16 (mild steel). The disc spring was selected so that a pressure of about 15 bar would be applied to each of the cell electrodes when the cell was crimped closed. The separator 20 was a Celgard #2502 microporous polypropylene film (Hoechst-Celanese), which had been wetted with a 1M solution of $LiPF_6$ dissolved in a 30:70 volume mixture of ethylene carbonate and diethyl carbonate (Mitsubishi Chemical). A gasket 27 was used as a seal and to separate the two terminals.

Elemental Analysis

Approximately 0.02 g of each sample was accurately weighed on a microbalance (to 1 µg) into a 50 mL glass class A volumetric flask. 2 mL hydrochloric acid and 1 mL nitric acid were then added to form a salt. Once the salt had dissolved, the solution was diluted to 50 mL with deionized water and the solution shaken to mix. This solution was diluted further 10 times. Next, a 5 mL aliquot was removed with a glass class A volumetric pipet and diluted to 50 mL in a glass class A volumetric flask with 4% HCl and 2% nitric acid.

The diluted solution were analyzed on a Jarrell-Ash 61E ICP using standards of 0, 1, 3, 10, and 20 ppm Co, Ni, Mn, Li, and Na in 4% HCl/2% HNO3. A 5 ppm standard of each element was used to monitor the stability of the calibration. All standards were prepared from a certified stock solution and with class A volumetric glassware. Prior to analysis of the elements, the injector tube of the ICP was cleaned to remove any deposits. All element calibration curves exhibited $r^2$ values in excess of 0.9999.

The analytical results were measured in weight percent. These values were then converted to atomic percent and then ultimately to a stoichiometry where the oxygen content had been normalized to a stoichiometry of 2.

Examples 1-6

Example 1 describes the synthesis of 0.1 mole of $Li[Li_{(1-2y)/3}Ni_yMn_{(2-y)/3}]O_2$ where y=0.416.

12.223 g of $Ni(NO_3)_2.6H_2O$ (Aldrich Chemical Co.) and 13.307 g of $Mn(NO_3)_2.4H_2O$ (Aldrich Chemical Co.) were dissolved in 30 mls of distilled water to form a transition metal solution. In a separate beaker, 9.575 g of $LiOH.H_2O$ (FMC Corp.) was dissolved in 200 mls of distilled water.

While stirring, the transition metal solution was added dropwise using a buret to the lithium hydroxide solution over a period of about 3 hours. This caused the co-precipitation of a Ni—Mn hydroxide and the formation of $LiNO_3$ (dissolved). The precipitate was recovered by filtration and washed repeatedly using vacuum filtration. It was then placed in a box furnace set to 180° C. to dry, after which it was mixed with 4.445 g $LiOH.H_2O$ in an autogrinder and pressed into a number of pellets, each weighing two grams.

The pellets were heated in air at 480° C. for 3 hours, after which they were quenched to room temperature, combined, and re-ground into powder. New pellets were pressed and heated in air to 900° C. for 3 hours. At the conclusion of the heating step, the pellets were quenched to room temperature and again ground to powder to yield the cathode material.

Elemental analysis of the cathode material revealed that the composition had the following stoichiometry: $Li[Li_{0.06}Ni_{0.393}Mn_{0.51}]O_2$, which is in close agreement with the target stoichiometry of $Li[Li_{0.06}Ni_{0.42}Mn_{0.53}]O_2$.

Examples 2-6 were prepared in analogous fashion except that the relative amounts of reactants were adjusted to yield samples in which y=0.083 (Example 2), 0.166 (Example 3), 0.25 (Example 4), 0.333 (Example 5), and 0.5 (Example 6). Elemental analysis of the cathode material from Example 5 revealed that the composition had the following stoichiometry: $Li[Li_{0.13}Ni_{0.314}Mn_{0.55}]O_2$, which is in close agreement with the target stoichiometry of $Li[Li_{0.11}Ni_{0.33}Mn_{0.56}]O_2$.

A powder x-ray diffraction pattern for each sample was collected using a Siemens D5000 diffractometer equipped with a copper target X-ray tube and a diffracted beam monochromator. Data was collected between scattering angles of 10 degrees and 130 degrees.

The crystal structure of each sample was determined based upon the x-ray diffraction data as described in (a) C. J. Howard and R. J. Hill, Australian Atomic Energy Commission Report No. M112 (1986); and (b) D. B. Wiles and R. A. Young, J. Appl. Cryst., 14:149-151 (1981). Lattice parameters were determined using the Rietveld refinement. The lattice parameters for each sample are reported in Table 1. The crystal structure of each sample could be described well by the O3 crystal structure type.

Electrochemical cells were constructed according to the above-described procedure using the material of Examples 1 and 3-6 as the cathode. Each cell was charged and discharged between 4.4 V and 3.0 V at 30° C. using computer-controlled discharge stations from Moli Energy Ltd. (Maple Ridge, B.C., Canada) and a current of 10 mA/g of active material. FIG. 3 is a plot of voltage versus capacity and capacity versus cycle number for each cell. Reversible and irreversible capacities were determined and are reported in Table 1. Each sample showed excellent reversibility and excellent capacity retention for at least 15 cycles.

A second set of electrochemical cells was constructed using the materials of Examples 1 and 3-6, and cycled as described above with the exception that the cells were charged and discharged between 4.8 V and 2.0 V using a current of 5 mA/g of active material. FIG. 3 is a plot of voltage versus capacity and capacity versus cycle number for each cell. Reversible and irreversible capacities were determined and are reported in Table 1. Each sample performed well. Examples 3 and 4 show large irreversible capacities, but still give stable reversible capacities over 200 mAh/g. Samples 1, 5, and 6 show irreversible capacities less than 30 mAh/g and reversible capacities greater than 200 mAh/g. In particular, Example 1 shows an irreversible capacity of only about 15 mAh/g and a reversible capacity of about 230 mAh/g.

TABLE 1

| Example | y | HTT (° C.) | a (Å) | c (Å) | Rev. Capacity mAh/g 3.0-4.4 V | Irrev. Capacity mAh/g 3.0-4.4 V | Rev. Capacity mAh/g 2.0-4.8 V | Irrev. Capacity mAh/g 2.0-4.8 V |
|---|---|---|---|---|---|---|---|---|
| 1 | 0.416 | 900 | 2.8793 | 14.2871 | 160 | 10 | 230 | 15 |
| 2 | 0.083 | 900 | 2.8499 | 14.2386 | * | * | * | * |
| 3 | 0.166 | 900 | 2.8589 | 14.2427 | 82 | 10 | 230 | 120 |
| 4 | 0.25 | 900 | 2.8673 | 14.258 | 117 | 12 | 250 | 50 |
| 5 | 0.333 | 900 | 2.8697 | 14.2654 | 142 | 10 | 240 | 25 |
| 6 | 0.5 | 900 | 2.8900 | 14.2971 | 140 | 10 | 200 | 25 |

"HTT" refers to the heat treatment temperature.
"a" and "c" represent lattice parameters.
An asterisk means "not tested."

Figure 12:
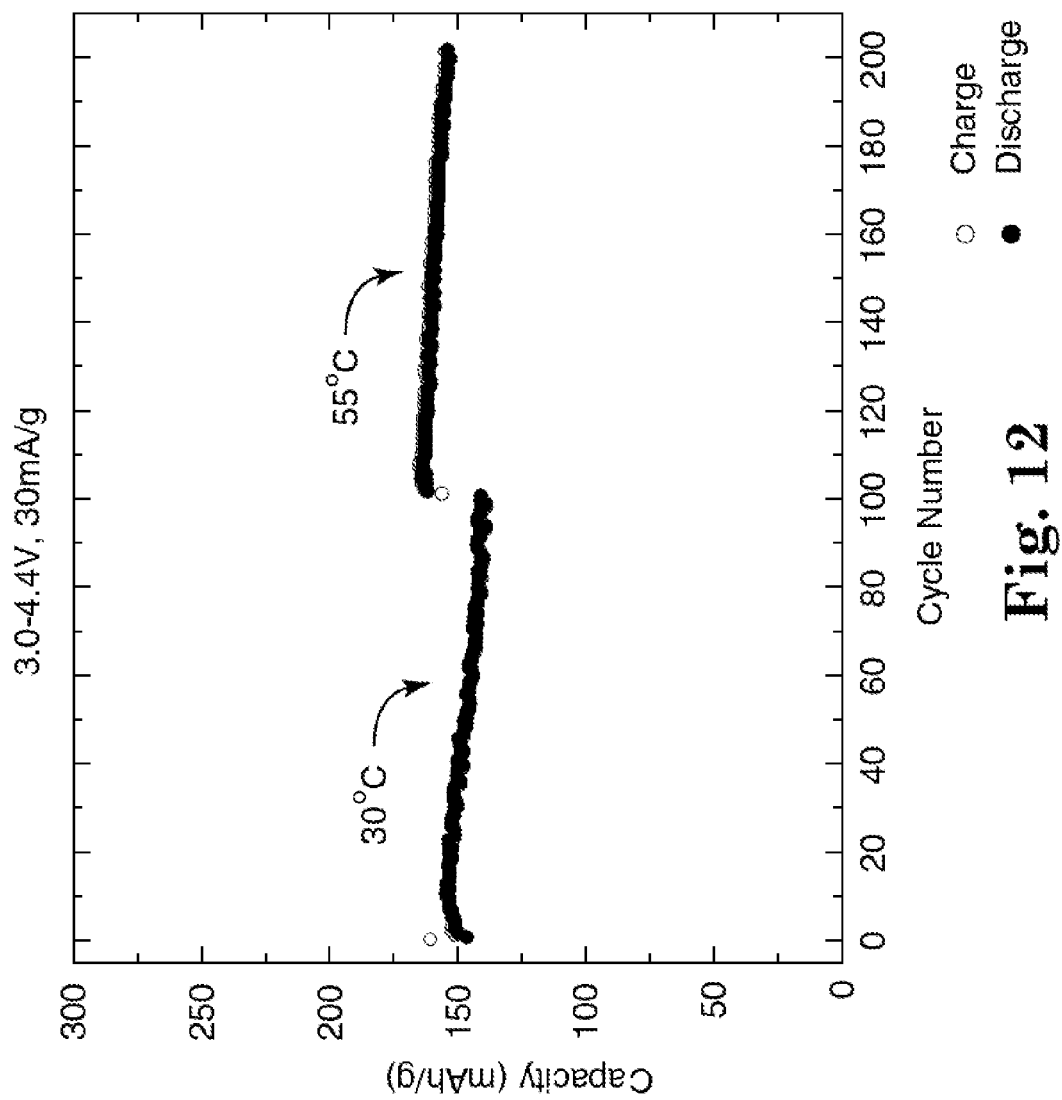
FIG. 12 is a plot of capacity versus cycle number for the sample described in Example 1 cycled between 4.4 V and 3.0 V at both 30° C. and 55° C.

Another electrochemical cell was assembled using the material of Example 1 and cycled between 3.0 V and 4.4 V using a current of 30 mA/g. Some cycles were collected at 30° C., while other cycles were collected at 55° C. The results are reported in FIG. 12. The capacity of the material was maintained even at 55° C. after extended cycling, demonstrating that the material did not exhibit phase separation after extended cycling.

Figure 13:
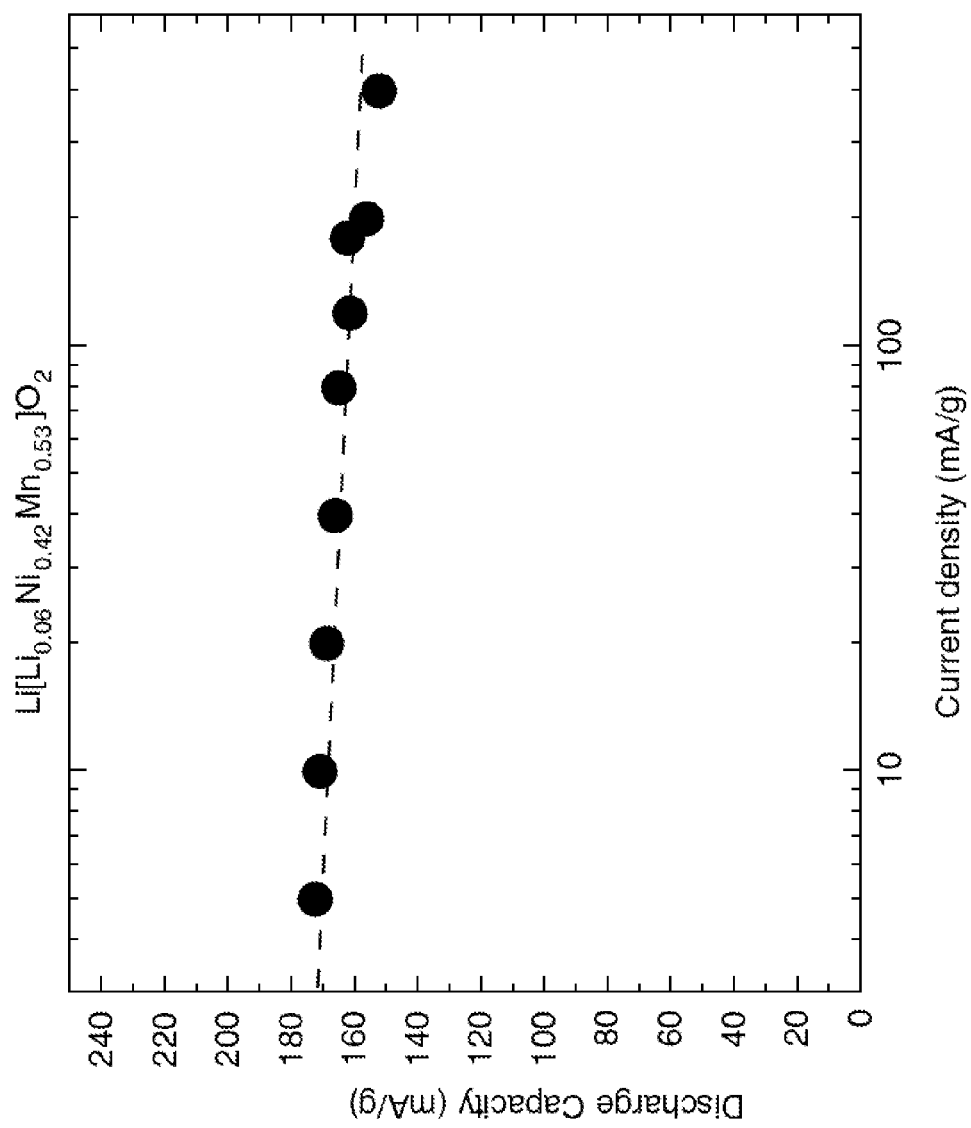
FIG. 13 is a plot of capacity versus discharge current density for the sample described in Example 1 measured at 30° C. to a 2.5 V cutoff.

Another electrochemical cell was assembled using the material of Example 1 and used to test the rate capability of the material. Data was collected at 30° C. up to a 2.0 V cutoff. The results are shown in FIG. 13. The results demonstrate that the capacity of the material was maintained even up to discharge currents as large as 400 mA/g.

Examples 7-9

Examples 7-9 were prepared following the procedure described for Examples 1-6 where y=0.166 except that the samples were heated at 600° C. (Example 7), 700° C. (Example 8), and 800° C. (Example 9), rather than 900° C. X-ray diffraction patterns for each sample were collected and are shown in FIG. 3, along with an x-ray diffraction pattern for Example 3 prepared at 900° C. The lattice parameters were also determined and are set forth in Table 2, along with the data for Example 3. The data demonstrate that as the heating temperature increases, the peak widths in the diffraction patterns become narrower, indicating increased crystallinity. All peaks can be understood based on the O3 crystal structure.

TABLE 2

| Example | y | HTT (° C.) | a (Å) | c (Å) |
|---|---|---|---|---|
| 7 | 0.166 | 600 | 2.8653 | 14.1739 |
| 8 | 0.166 | 700 | 2.8614 | 14.2076 |
| 9 | 0.166 | 800 | 2.8597 | 14.2289 |
| 3 | 0.166 | 900 | 2.8589 | 14.2427 |

"HTT" refers to the heat treatment temperature.
"a" and "c" represent lattice parameters.

Examples 10-12

Examples 10-12 were prepared following the procedure described for Examples 1-6 where y=0.333 except that the samples were heated at 600° C. (Example 10), 700° C. (Example 11), and 800° C. (Example 12), rather than 900° C. X-ray diffraction patterns for each sample were collected and are shown in FIG. 4, along with an x-ray diffraction pattern for Example 5 prepared at 900° C. The lattice parameters were also determined and are set forth in Table 3, along with the data for Example 5. The data demonstrate that as the heating temperature increases, the peak widths in the diffraction patterns become narrower, indicating increased crystallinity. All peaks can be understood based on the O3 crystal structure.

Electrochemical cells were constructed using material from Examples 10 and 12 as the cathode, as cycled as described above. The reversible and irreversible capacities are also reported in Table 3, along with data for Example 5. All samples performed well.

TABLE 3

| Example | y | HTT (° C.) | a (Å) | c (Å) | Rev. Capacity mAh/g 3.0-4.4 V | Irrev. Capacity mAh/g 3.0-4.4 V | Rev. Capacity mAh/g 2.0-4.8 V | Irrev. Capacity mAh/g 2.0-4.8 V |
|---|---|---|---|---|---|---|---|---|
| 10 | 0.333 | 600 | 2.8800 | 14.2389 | 110 | 50 | 210 | 65 |
| 11 | 0.333 | 700 | 2.8761 | 14.2569 | * | * | * | * |
| 12 | 0.333 | 800 | 2.8714 | 14.2644 | 120 | 20 | 230 | 50 |
| 5 | 0.333 | 900 | 2.8697 | 14.2654 | 160 | 10 | 230 | 15 |

"HTT" refers to the heat treatment temperature.
"a" and "c" represent lattice parameters.
An asterisk means "not tested."

Examples 13-15

Examples 13-15 were prepared following the procedure described for Examples 1-6 where y=0.416 except that the samples were heated at 600° C. (Example 13), 700° C. (Example 14), and 800° C. (Example 15), rather than 900° C. The lattice parameters were determined for each sample and are set forth in Table 4, along with the data for Example 1 (y=0.416, 900° C.). These samples also exhibited the O3 crystal structure.

TABLE 4

| Example | y | HTT (° C.) | a (Å) | c (Å) |
|---|---|---|---|---|
| 13 | 0.416 | 600 | 2.8829 | 14.2609 |
| 14 | 0.416 | 700 | 2.8824 | 14.2720 |
| 15 | 0.416 | 800 | 2.8824 | 14.2808 |
| 1 | 0.416 | 900 | 2.8793 | 14.2781 |

"HTT" refers to the heat treatment temperature.
"a" and "c" represent lattice parameters.

Examples 16-18

Examples 16-18 were prepared following the procedure described for Examples 1-6 where y=0.5 except that the samples were heated at 600° C. (Example 16), 700° C. (Example 17), and 800° C. (Example 18), rather than 900° C. X-ray diffraction patterns for each sample were collected and are shown in FIG. 6, along with an x-ray diffraction pattern for Example 6 prepared at 900° C. The lattice parameters were also determined and are set forth in Table 5, along with the data for Example 6. The data demonstrate that as the heating temperature increases, the peak widths in the diffraction patterns become narrower, indicating increased crystallinity. All peaks can be understood based on the O3 crystal structure.

Electrochemical cells were constructed using material from Examples 16-18 as the cathode, as cycled as described above. The reversible and irreversible capacities are also reported in Table 5, along with data for Example 6. In addition, FIG. 7 reports voltage versus capacity and capacity versus cycle number for each cell, as well as a cell constructed using Example 6, when cycled between 4.4 V and 3.0 V. FIG. 8 reports voltage versus capacity and capacity versus cycle number for each cell, as well as a cell constructed using Example 6, when cycled between 4.8 V and 2.0 V. All samples performed well, with samples prepared at higher temperatures exhibiting the best capacity retention and lowest irreversible capacity.

TABLE 5

| Example | y | HTT (° C.) | a (Å) | c (Å) | Rev. Capacity mAh/g 3.0-4.4 V | Irrev. Capacity mAh/g 3.0-4.4 V | Rev. Capacity mAh/g 2.0-4.8 V | Irrev. Capacity mAh/g 2.0-4.8 V |
|---|---|---|---|---|---|---|---|---|
| 16 | 0.5 | 600 | 2.8926 | 14.298 | 120 | 60 | 200 | 50 |
| 17 | 0.5 | 700 | 2.8914 | 14.2842 | 140 | 20 | 210 | 25 |
| 18 | 0.5 | 800 | 2.8889 | 14.2812 | 145 | 15 | 210 | 20 |
| 6 | 0.5 | 900 | 2.8899 | 14.2964 | 140 | 10 | 200 | 25 |

"HTT" refers to the heat treatment temperature.
"a" and "c" represent lattice parameters.

Examples 19-20

Example 19 describes the preparation of 0.1 mole of Li[Ni$_y$Co$_{1-2y}$Mn$_y$]O$_2$ where y=0.375. The procedure described in Examples 1-6 was followed except that the following reactants were used: 10.918 g of Ni(NO$_3$)$_2$.6H$_2$O, 9.420 g of Mn(NO$_3$)$_2$.4H$_2$O, and 7.280 g of Co(NO$_3$)$_2$.6H$_2$O. In addition, the dried transition metal hydroxide was mixed with 4.195 g of LiOH.H$_2$O. The lattice parameters were measured and determined to be: a=2.870 Å and c=14.263 Å. Elemental analysis of the material revealed that the composition had the following stoichiometry: Li$_{1.04}$[Ni$_{0.368}$Co$_{0.263}$Mn$_{0.38}$]O$_2$, which is in close agreement with the target stoichiometry of Li[Ni$_{0.375}$Co$_{0.25}$Mn$_{0.375}$]O$_2$.

Example 20 was prepared in similar fashion except that the relative amounts of ingredients were adjusted to yield y=0.25. The lattice parameters were measured and determined to be: a=2.8508 and c=14.206 Å. Elemental analysis of the material revealed that the composition had the following stoichiometry: Li$_{1.03}$[Ni$_{0.243}$Co$_{0.517}$Mn$_{0.25}$]O$_2$, which is in close agreement with the target stoichiometry of Li[Ni$_{0.25}$Co$_{0.5}$Mn$_{0.25}$]O$_2$.

Figures 9A, 9B:
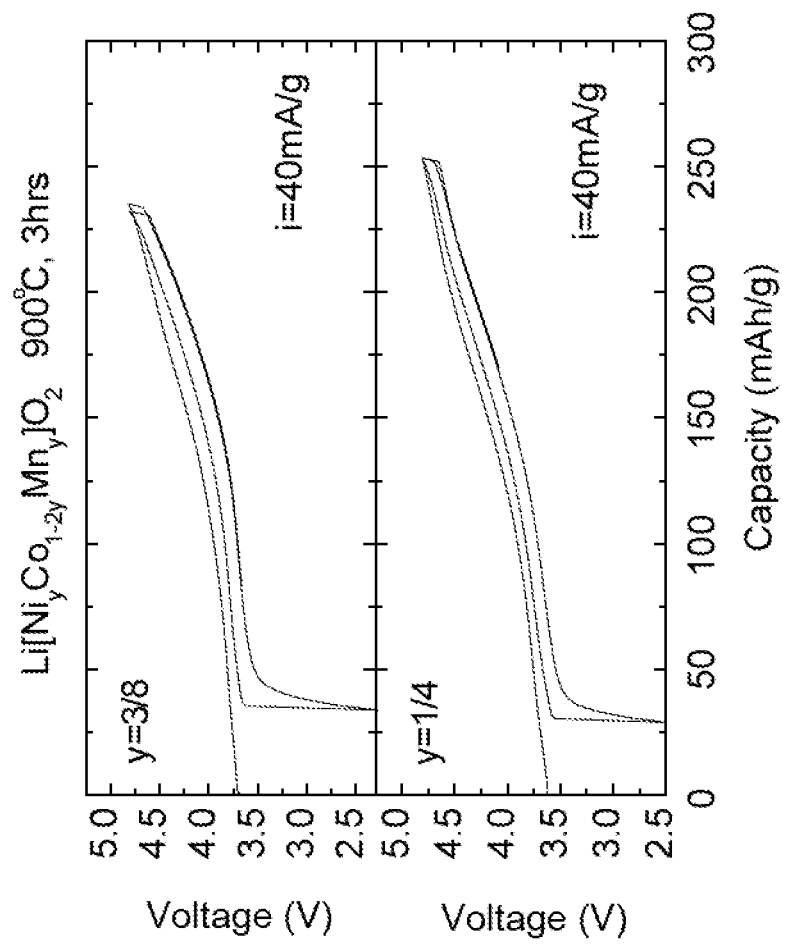
FIGS. 9(a)-(b) are plots of voltage versus capacity for the samples described in Examples 19 and 20.

Electrochemical cells were constructed using material from Examples 19-20 as the cathode, as cycled as described above. FIG. 9 reports voltage versus capacity for each cell when cycled between 2.5 V and 4.8 V. Both samples performed well.

Figure 10:
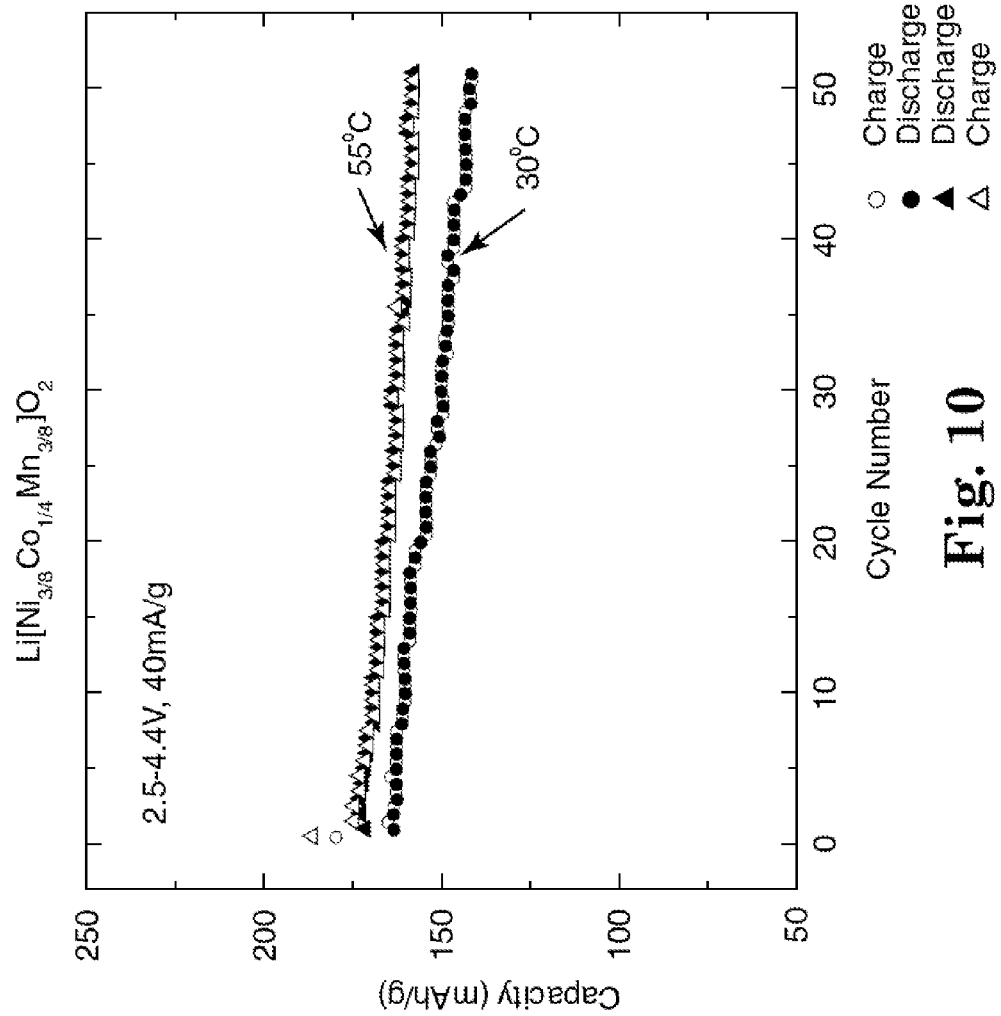
FIG. 10 is a plot of capacity versus cycle number for the sample described in Example 19 cycled between 4.4V and 2.5 V.
Figure 11:
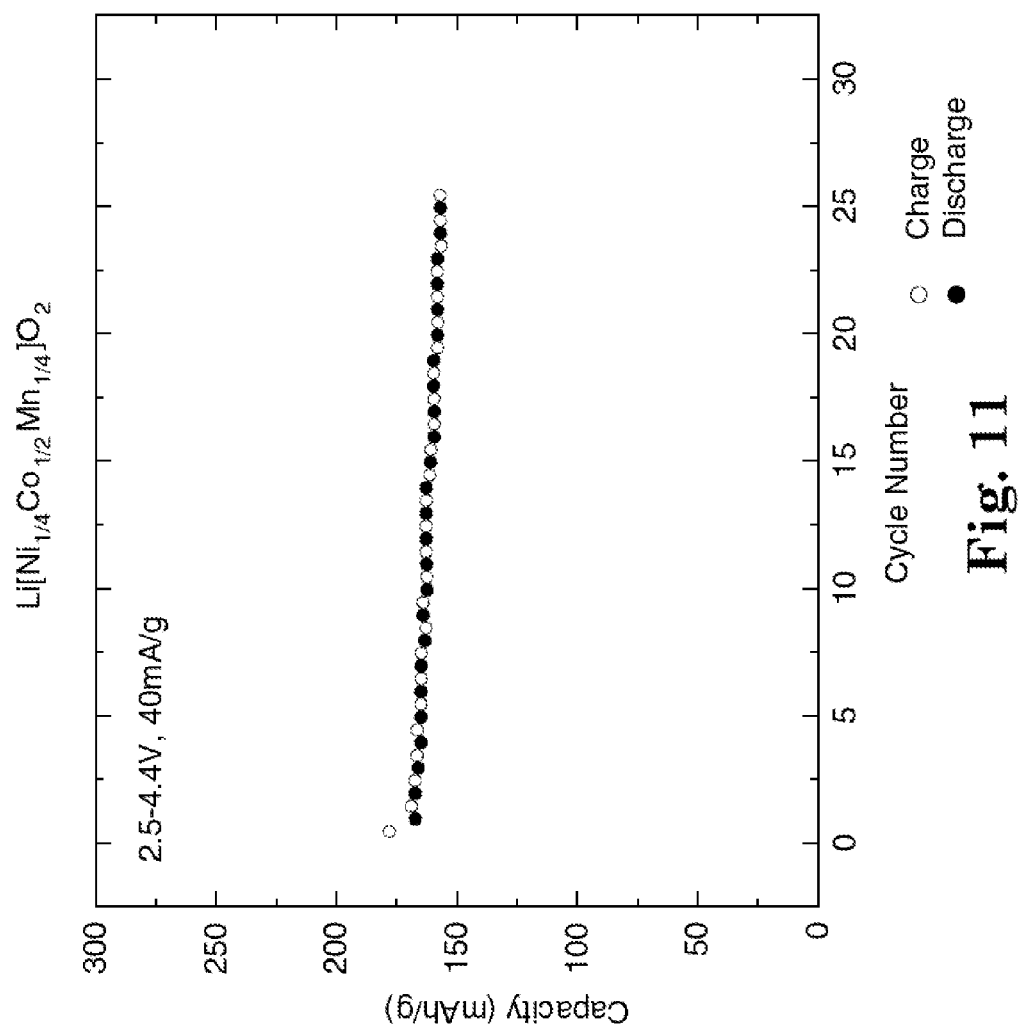
FIG. 11 is a plot of capacity versus cycle number for the sample described in Example 20 cycled between 4.4 V and 2.5 V.

A second set of electrochemical cells was constructed using material from Examples 19-20 and cycled as described above between 2.5 V and 4.4 V using a current of 40 mA/g. The results are shown in FIGS. 10 and 11. In the case of Example 19 (FIG. 10), data was collected at both 30° C. and 55° C., whereas in the case of Example 20 (FIG. 11) data was collected at 30° C. only. Both samples performed well.

The cathode material from Example 19 was further analyzed using differential scanning calorimetry (DSC). The sample cell was a 3.14 mm outer diameter, type 304 stainless steel seamless tube having a wall thickness of 0.015 mm that had been cut into an 8.8 mm long piece (MicroGroup, Medway, Mass.). The cell was cleaned, after which one end was flattened. The flattened end was then welded shut by tungsten inert gas welding using a Miller Maxstar 91 ARC welder equipped with a Snap Start II high frequency ARC starter.

Once the flattened end had been sealed, the tube was loaded in an argon-filled glove box with 2 mg of the cathode material from Example 19 taken from a 2325 coin cell that had been charged to 4.2 V using the procedure described above. The electrolyte was not removed from the cathode sample. After the sample was loaded, the tube was crimped and welded shut.

The DSC measurements were performed using a TA Instruments DSC 910 instrument. The DSC sweep rate was 2° C./minute. Both the onset temperature and the total heat evolved were recorded. The onset temperature corresponds to the temperature at which the first major exothermic peak occurs. The results are shown in Table 6. For the sake of comparison, data from cathodes prepared using LiNiO$_2$ and LiCoO$_2$ is included as well. The results demonstrate that cathodes prepared using the material from Example 19 exhibited a higher onset temperature and evolved less heat than cathodes prepared using LiNiO$_2$ and LiCoO$_2$.

TABLE 6

| Material | Onset Temperature (° C.) | Total Heat (J/g) |
|---|---|---|
| Example 19 | 290 | 404 |
| LiNiO$_2$ | 180 | 1369 |
| LiCoO$_2$ | 185 | 701 |

A number of embodiments of the invention have been described. Nevertheless, it will be understood that various modifications may be made without departing from the spirit and scope of the invention. Accordingly, other embodiments are within the scope of the following claims.

What is claimed is:

1. A lithium-ion battery comprising:
   an anode;
   a cathode having a cathode composition of the formula Li[M$^4_y$M$^5_{1-2y}$Mn$_y$]O$_2$, wherein 0.083<y<0.5 with the proviso that M$^4$ and M$^5$ do not include chromium, and wherein M$^4$ is Co and M$^5$ includes the combination of Li and Ni; and
   an electrolyte.

2. A lithium-ion battery according to claim 1 wherein M$^5$ further comprises Co, Fe, Cu, Zn, V, or combinations thereof.

3. A lithium-ion battery according to claim 1 wherein 0.167<y<0.5.

4. A lithium-ion battery according to claim 1 wherein the composition has a c-axis lattice constant of about 14.17 to about 14.28.

5. A lithium-ion battery according to claim 1 wherein M$^4$ is Co and M$^5$ includes the combination of Li and Ni, and wherein the composition has a c-axis lattice constant of about 14.20 to about 14.27.

6. A lithium-ion battery according to claim 1 wherein M$^4$ is Co and M$^5$ includes the combination of Li and Ni, and wherein the composition has a c-axis lattice constant of about 14.24 to about 14.26.

7. A lithium-ion battery according to claim 1 wherein the composition has a reversible capacity of at least about 200 mAh/g.

8. A lithium-ion battery according to claim 1 wherein the composition has an onset temperature above 185° C. as analyzed by differential scanning calorimetry.

* * * * *

UNITED STATES PATENT AND TRADEMARK OFFICE
CERTIFICATE OF CORRECTION

PATENT NO. : 8,685,565 B2  Page 1 of 1
APPLICATION NO. : 13/537766
DATED : April 1, 2014
INVENTOR(S) : Zhonghua Lu It is certified that error appears in the above-identified patent and that said Letters Patent is hereby corrected as shown below:

On the Title Page
Column 2, Page 3 (Other Publications)
Line 8-9, Delete "$Li_xNi_{-y}Co_yO_2$" and insert -- $Li_xNi_{1-y}Co_yO_2$ --, therefor.
Line 53, Delete "Solide" and insert -- Solid --, therefor.
Line 63, Delete "Cetner," and insert -- Center, --, therefor.

In the Specification
Column 9
Line 25-25, Delete "$Li_{1.04}[Ni_{0.368}Co_{0.263}Mn_{0.38]O2}$," and insert -- $Li_{1.04}[Ni_{0.368}Co_{0.263}Mn_{0.38}]O_2$, --, therefor
Line 31, Delete "a=2.8508" and insert -- a=2.8508 Å --, therefor.
Line 34, Delete "$Li_{1.03}[Ni_{0.243}Co_{0.517}Mn_{0.25]O2}$," and insert -- $Li_{1.03}[Ni_{0.243}Co_{0.517}Mn_{0.25}]O_2$, --, therefor.

Signed and Sealed this
Ninth Day of September, 2014

Michelle K. Lee
*Deputy Director of the United States Patent and Trademark Office*